United States Patent [19]

Harada et al.

[11] Patent Number: 4,924,982
[45] Date of Patent: May 15, 1990

[54] OIL PRESSURE CLUTCH MECHANISM FOR AN AUTOMATIC TRANSMISSION

[75] Inventors: Kouhei Harada, Nagoya; Hiromi Hasegawa, Obu, both of Japan

[73] Assignee: Aisin Seiki Kabushiki Kaisha, Kariya, Japan

[21] Appl. No.: 272,331

[22] Filed: Nov. 17, 1988

[30] Foreign Application Priority Data

Nov. 18, 1987 [JP] Japan .................. 62-175000[U]

[51] Int. Cl.⁵ .................. F16D 21/04; F16D 25/10
[52] U.S. Cl. .................. 192/48.8; 192/85 AA; 192/87.1; 192/87.11
[58] Field of Search ........... 192/48.91, 85 AA, 106 F, 192/87.11, 85 R, 85 A, 48.8, 87.1, 87.14, 87.15, 87.16

[56] References Cited

U.S. PATENT DOCUMENTS

| | | | |
|---|---|---|---|
| 3,301,142 | 1/1967 | Cenko | 192/85 AA |
| 4,711,138 | 12/1987 | Miura | 192/87.11 X |
| 4,741,422 | 5/1988 | Fuehrer | 192/87.11 |
| 4,836,052 | 6/1989 | Iwanaga et al. | 192/85 AA X |

FOREIGN PATENT DOCUMENTS

| | | | |
|---|---|---|---|
| 0586629 | 11/1959 | Canada | 192/85 AA |
| 0166726 | 9/1984 | Japan | 192/85 AA |
| 0052449 | 3/1986 | Japan | 192/85 AA |
| 0141343 | 6/1987 | Japan | 192/87.1 |

*Primary Examiner*—Rodney H. Bonck
*Attorney, Agent, or Firm*—Burns, Doane, Swecker & Mathis

[57] ABSTRACT

An oil pressure clutch mechanism of an automatic transmission is comprised of at least two clutches interposed coaxially in a front drum. An oil circuit for controlling the clutches is formed in the front drum in relation to an oil circuit in an oil pump cover. The oil circuit includes circular oil grooves formed between an outer face of the oil pump cover and an inner face of the drum. A circular drain groove is disposed axially between the circular oil grooves to receive oil leaked therefrom. A drain passage is formed in the front drum for conducting leaked oil from the drain groove to a location external of the front drum. The outlet end of the drain groove is spaced farther from the axis than is the inlet end thereof, whereby leaked oil is discharged through the oil drain passage under the influence of centrifugal force.

8 Claims, 2 Drawing Sheets

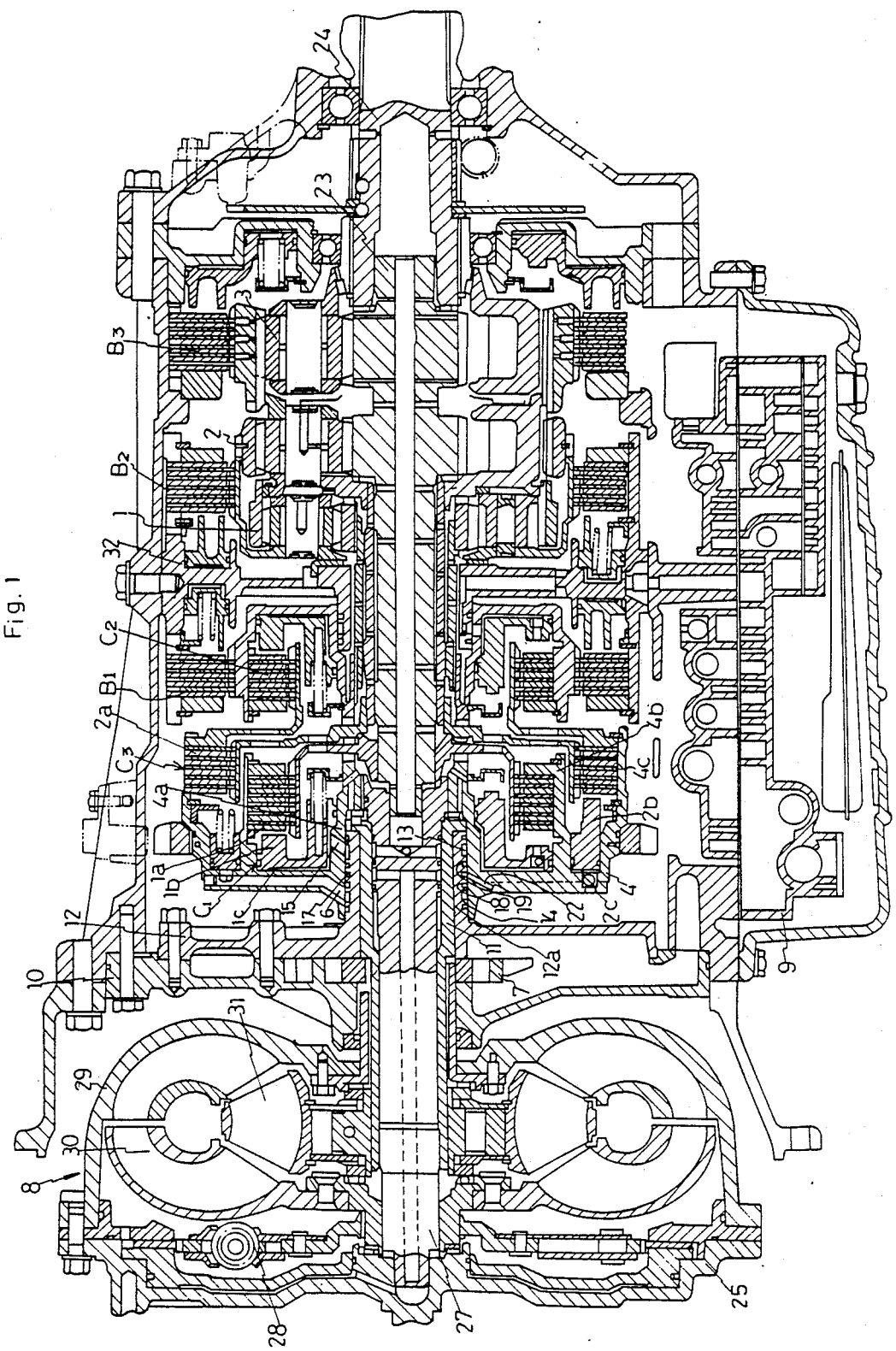

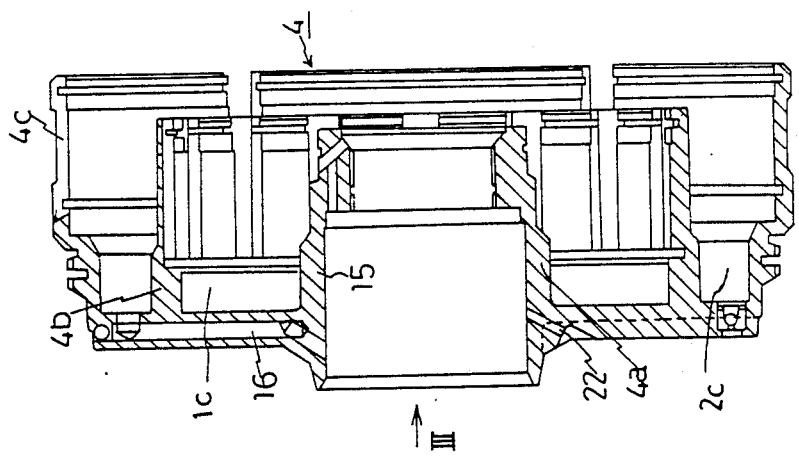
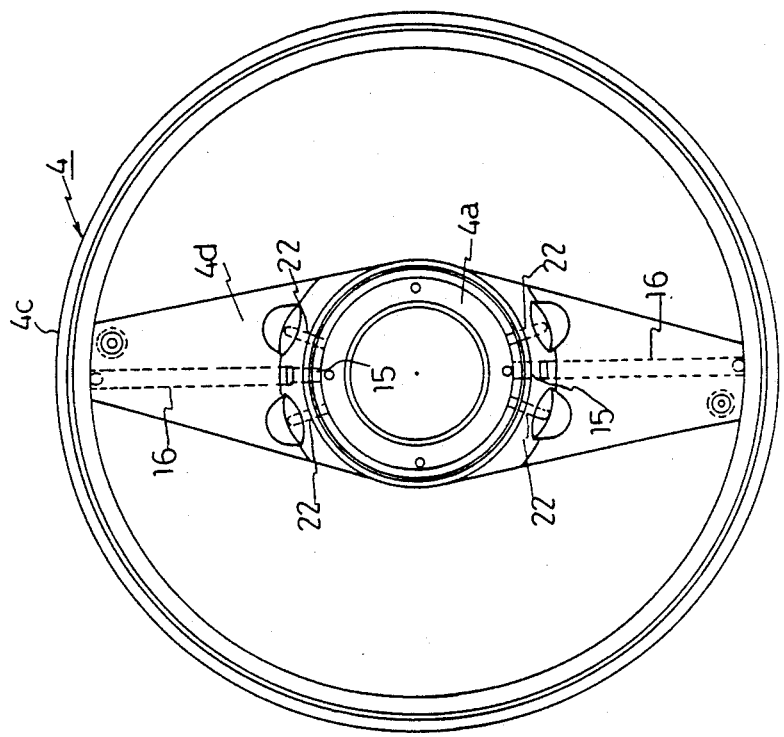

OIL PRESSURE CLUTCH MECHANISM FOR AN AUTOMATIC TRANSMISSION

BACKGROUND OF THE INVENTION

1. Field of the Invention

The invention relates generally to an automatic transmission and more particularly to an oil pressure clutch mechanism of the automatic transmission.

2. Description of Prior Art

The automatic transmission which has plural oil pressure clutches has a problem in that oil leaks out from a first passage (i.e., a passage for one oil pressure cylinder which controls the frictional engagement of one oil pressure clutch) to a second passage (i.e. a passage for another oil pressure cylinder which controls the frictional engagement of the other oil pressure clutch). Therefore, when the other oil pressure clutch is in disengagement, oil leaks out from the first passage to the second passage because of the differential pressure and flows into the second oil pressure cylinder, and the leaked oil generates fluid pressure in response to being subjected to centrifugal force created by the rotation of the parts of the automatic transmission. The centrifugally generated oil pressure acts against the piston of the other oil pressure cylinder to engage the frictional engaging parts of the other oil pressure clutch. In the frictional engaging parts of the other oil pressure clutch, therefore, the frictional material burns out, the output shaft locks out and the parts are damaged.

In order to prevent the above-mentioned oil leakage and the clutch engagement through the centrifugally generated oil pressure, the patent application TOKU-KAI-SHO 62-4932 suggests an oil pressure clutch mechanism. The oil pressure clutch comprises a pair of oil pressure chambers which are formed on both axial ends of a piston housing which is fixed to a clutch shaft. A pair of clutch pistons are inserted in the oil pressure chambers so as to move axially therein. An oil circuit supplies oil to the oil pressure chambers to move the clutch pistons. A hole is formed in the piston housing for communicating the pair of oil pressure chambers. A drain port communicates the hole and a region external to the piston housing. A spool is slidably interposed in the hole, which has (i) a flange of larger diameter than the end of the hole which projects in one oil pressure chamber, (ii) a plate of larger diameter than the other end of the hole which projects communication with the other oil pressure chamber, and (iii) a recess along the length of the hole. A spring is disposed between the flange and the side end of the clutch piston.

This conventional oil pressure clutch arrangement for axially side-by-side clutches prevents clutch engagement by centrifugally generated pressure of leaked oil. This conventional clutch arrangement has certain shortcomings, however, namely cost because of increased parts, difficulty in adapting to clutches which are coaxially arranged (as opposed to a side-by-side arrangement), and the impossibility of setting both of the clutches at the same time in a state of engagement or disengagement.

SUMMARY OF THE INVENTION

It is an object of the invention to provide an oil pressure clutch mechanism of an automatic transmission which prevents the engagement of a clutch due to an oil leakage and the resultant centrifugal pressurizing of such leaked oil.

It is another object of the invention to provide such an oil pressure clutch mechanism which does not involve an appreciable increase in the number of parts.

It is another object of the invention to provide such an oil pressure clutch mechanism in which a pair of the clutches are coaxially arranged.

It is another object of the invention to provide such an oil pressure clutch mechanism in which a pair of the clutches can be simultaneously disposed in engagement or disengagement.

In order to accomplish the objects, an oil pressure clutch mechanism of an automatic transmission is provided with at least two clutches interposed in a front drum and intermittently controlled by respective oil pressure piston cylinders. An oil pump cover has a boss which is coaxially inserted into a boss of the front drum. A circular groove for each clutch is formed between seal rings on the outside of the boss of the oil pump cover. An oil passage for each clutch is formed in the front drum and is communicated with each circular groove. The oil pressure piston cylinders are controlled by oil pressure from an oil pump through the respective circular groove and the oil passage. A circular drain groove is formed between the circular grooves on the outside of the boss of the oil pump cover to receive leaked oil. An oil drain passage is formed in the boss of the front drum, and has an inlet end communicating with the drain groove and an outlet end opening to the exterior of the drum. The outlet end is spaced farther from the axis than is the inlet end, whereby leaked oil is discharged through the drain passage under the influence of centrifugal force.

BRIEF DESCRIPTION OF THE DRAWINGS

FIG. 1 is a longitudinal cross section through an automatic transmission in accordance with the invention.

FIG. 2 is a longitudinal cross section through a front drum of an oil pressure clutch mechanism of FIG. 1.

FIG. 3 is a front view of the front drum viewed in direction III in FIG. 2.

DETAILED DESCRIPTION OF A PREFERRED EMBODIMENT OF THE INVENTION

As depicted in FIG. 1 an automatic transmission contains three planetary gears 1, 2 and 3, three frictional clutches C1, C2 and C3 and three brakes B1, B2 and B3. As apparent from Table 1 the transmission has six forward stages and one reverse stage, according to the combination of the frictional clutches C1, C2 and C3, and the brakes B1, B2 and B3.

TABLE 1

| | Engaging pattern of clutches and brakes | | | | | |
|---|---|---|---|---|---|---|
| | Clutch | | | Brake | | |
| | C1 | C2 | C3 | B1 | B2 | B3 |
| 1st | 0 | | | | | 0 |
| 2nd | 0 | | | | 0 | |
| 3rd | 0 | | | 0 | | |
| 4th | 0 | | 0 | | | |
| 5th | | | 0 | 0 | | |
| 6th | | | 0 | | 0 | |
| Rev | | 0 | | | | 0 |
| N | | | | | | 0 |

0—State of engaging

As shown in FIG. 1 the automatic transmission contains an oil pump gear 7, a torque convertor 8, a valve body 9 controlled by oil pressure, an oil pump body 10, a stator shaft 11, an oil pump cover 12, a front drum 4, a center shaft 23, an output shaft 24, a front cover 25, an input shaft 27, a lockup damper 28, a pump impeller 29, a turbine runner 30, a stator 31 and a center support 32.

As shown in FIG. 2, a front drum 4 has a cylindrical boss 4a in the center, an inner cylinder 4b which is disposed coaxially and radially outwardly of the boss 4a, and outer cylinder 4c which is telescoped coaxially within the boss 4a and located radially outward of the inner cylinder 4b. The frictional clutch C1 is interposed inwardly of the inner cylinder 4b and is constituted so that a multiple disc clutch 1a is controlled in a state of engaging or disengaging by a clutch piston 1b. The clutch piston 1b is of generally ring shape, and is driven by oil pressure in a circular oil pressure cylinder chamber 1c which is formed between the boss 4a and the inner cylinder 4b. The oil pressure cylinder chamber 1c is communicated with a circular groove 13 formed on the outer face of the boss 12a of the oil pump cover 12 through a passage 15 formed in the wall of the boss 4a. The circular groove 13 is communicated with a groove (not shown in figures) formed on the outer face of the stator shaft 11.

The friction clutch C3 is disposed between the outer cylinder 4C and the inner cylinder 4b and is constructed so that a multiple disc clutch 2a is controlled in state of engaging or disengaging by a clutch piston 2b. The clutch piston 2b is of generally ring shape similar to the clutch piston 1b, and is driven by oil pressure in a circular oil pressure cylinder chamber 2c formed between the inner cylinder 4b and the outer cylinder 4c. The oil pressure cylinder chamber 2c is communicated with a circular groove 14 formed on the outer face of the boss 12a of the oil pump cover 12 via passages 16 formed in radial ribs 4d and boss 4a of the front drum 4. The circular groove 14 is communicated with a groove (not shown in figures) formed on the outer face of the stator shaft 11, as is the circular groove 13.

Seal rings 18 and 19 are disposed in an interface defined by an inner face of the boss 4a and the outer face of the boss 12a of the oil pump cover 12. The rings are spaced axially by a short distance from the circular grooves 13 and 14. A circular drain groove 17 is formed on the outer face of the boss 12a of the oil pump cover 12 between the seal rings 18 and 19. A drain oil passage 22 is formed in the boss 4a of the front drum 4 for communication with the circular groove 17. One end of the drain oil passage 22 is communicated with the circular drain groove 17, and the other end of the drain oil passage 22 is opening on the face of the diameter rib 4d of the front drum 4.

Oil pressure is generated by a part of the torque of the engine (not shown in figures) which rotates the oil pump gear 7 by means of the torque convertor 8. That oil pressure is transferred to the valve body 9, and is regulated so that the pressure is adapted to control the clutches C1, C2 and C3 and the brakes B1, B2 and B3, and returns to each passage of the oil pump body 10. The operating oil for the controlling of the frictional clutches C1 and C3 passes through the grooves formed on the outer face of the stator shaft 11 and is supplied to the passages 15 and 16 for the clutches C1 and C3 through the circular grooves 13 and 14.

The operation of the oil pressure clutch mechanism is explained below.

When the one of clutches C1 and C3 is in a state of engagement and the front drum 4 is rotating, the operating oil leaks out of the circular groove 13 which defines an oil circuit of the frictional clutch C1 or out of the circular groove 14 which defines an oil circuit of the frictional clutch C3. Oil which leaks past the seal rings 18 and 19 enters the circular drain groove 17 and is discharged through the drain passage 22 by centrifugal force generated by the rotation of the front drum 4. Therefore, when the operating oil leaks from either of the oil circuits of the frictional clutches C1 and C3 in a state of engagement, the leaked oil does not get into the other of the oil circuits, and the other frictional clutch in a state of disengagement does not become engagement by the centrifugal force.

The construction of the passages of this invention is adapted to the parts on which the passages communicate the fixed parts with the rotatable parts. In particular, the preferred embodiment applies to plural passages for at least two oil pressure clutches which would otherwise have a problem resulting from centrifugally pressurized leaked oil.

The clutch mechanism of the invention forcibly discharges leaked oil by centrifugal force, therefore the leaked oil does not get into the other oil circuit and it prevents the leaked oil from generating a fluid pressure.

The clutch mechanism of the invention is constructed easily, is not affected by oil temperature (namely, coefficient of viscosity), and operates reliably.

In manufacturing, a circular drain groove is cut in an oil pump cover and a drain oil passage is drilled in a front drum. This is a simple operation which yields the above discussed advantages.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. An oil pressure clutch mechanism for an automatic transmission, comprising:
   a front drum including a first boss and first and second piston chambers, said first boss defining an axis of said front drum,
   first and second clutches mounted in said front drum,
   first and second pistons displaceably mounted in said first and second piston chambers, respectively, for actuating said first and second clutches,
   an oil cover including a second boss coaxially disposed in said first boss and including an outer face defining an interface with an inner face of said first boss,
   first and second axially spaced oil conducting circular grooves formed in said outer face of said second boss,
   first and second oil passages formed in said front drum in a manner connecting said circular grooves with respective ones of said piston chambers for conducting oil from a pump to said piston chambers to displace said first and second pistons,
   seal means in said interface for resisting leakage of fluid from said first and second circular grooves,
   a circular drain groove formed in said interface axially between said first and second circular grooves for receiving leaked oil therefrom, and an oil drain passage extending through said front drum, said oil drain passage having an inlet end communicating with said drain groove and an outlet end opening to the exterior of said front drum, said outlet end spaced farther from said axis than said inlet end is spaced from said axis, whereby leaked oil is discharged through said oil drain passage under the action of centrifugal force.

2. An oil pressure clutch mechanism according to claim 1 wherein said first and second clutches are coaxially arranged one inside of the other.

3. An oil pressure clutch mechanism for an automatic transmission, comprising:
  a front drum including a first boss and inner and outer cylindrical walls coaxial with said first boss, said outer cylindrical wall and said inner cylindrical wall defining a first piston chamber, and said inner cylindrical wall and said first boss defining a second piston chamber;
  an oil cover including a second boss coaxially disposed inside said first boss, an outer face of said second boss forming an interface with an inner face of said first boss;
  first and second axially spaced oil conducting grooves formed in said outer face of said second boss;
  first and second oil passages formed in said front drum for conducting oil from said first and second oil conducting grooves to said first and second piston chambers, respectively;
  a drain groove formed in said interface for receiving leaked oil from said first and second oil conducting grooves; and
  an oil drain passage formed in said front drum for conducting leaked oil from said drain groove to the exterior of said front drum.

4. An oil pressure clutch mechanism for an automatic transmission as claimed in claim 3, further comprising:
  first and second seal means in said interface for respectively resisting leakage of fluid from said first and second oil conducting grooves, said drain groove formed in said interface axially between said first and second seal means.

5. An oil pressure clutch mechanism for an automatic transmission as claimed in claim 3, further comprising:
  a radially extending rib formed on said front drum, said first oil passage being formed in said rib.

6. An oil pressure clutch mechanism for an automatic transmission, comprising:
  a front drum including a first boss and first and second piston chambers, said first boss defining an axis of said front drum,
  first and second clutches mounted in said front drum,
  first and second pistons displaceably mounted in said first and second piston chambers, respectively, for actuating said first and second clutches,
  an oil cover including a second boss coaxially disposed in said first boss and including an outer face defining an interface with an inner face of said first boss,
  first and second axially spaced oil conducting circular grooves formed in said outer face of said second boss,
  first and second oil passages formed in said front drum in a manner connecting said circular grooves with respective ones of said piston chambers for conducting oil from a pump to said piston chambers to displace said first and second pistons,
  seal means in said interface for resisting leakage of fluid from said first and second circular grooves,
  a circular drain groove formed in said interface axially between said first and second circular grooves for receiving leaked oil therefrom, and
  an oil drain passage extending through said front drum, said oil drain passage having an inlet end communicating with said drain groove and an outlet end opening to the exterior of said front drum, said outlet end spaced farther from said axis than said inlet end is spaced from said axis, whereby leaked oil is discharged through said oil drain passage under the action of centrifugal force;
  wherein said front drum includes an outer cylinder disposed radially outwardly of said first boss, and an inner cylinder disposed between said outer cylinder and said first boss, said outer and inner cylinders defining said first piston chamber, and said inner cylinder and said first boss defining said second piston chamber.

7. An oil pressure clutch mechanism for an automatic transmission, comprising:
  a front drum including a first boss and first and second piston chambers, said first boss defining an axis of said front drum,
  first and second clutches mounted in said front drum,
  first and second pistons displaceably mounted in said first and second piston chambers, respectively, for actuating said first and second clutches,
  an oil cover including a second boss coaxially disposed in said first boss and including an outer face defining an interface with an inner face of said first boss,
  first and second axially spaced oil conducting circular grooves formed in aid outer face of said second boss,
  first and second oil passages formed in said front drum in a manner connecting said circular grooves with respective ones of said piston chambers for conducting oil from a pump to said piston chambers to displace said first and second pistons,
  seal means in said interface for resisting leakage of fluid from said first and second circular grooves,
  a circular drain groove formed in said interface axially between said first and second circular grooves for receiving leaked oil therefrom, and
  an oil drain passage extending through said front drum, said oil drain passage having an inlet end communicating with said drain groove and an outlet end opening to the exterior of said front drum, said outlet end spaced farther from said axis than said inlet end is spaced from said axis, whereby leaked oil is discharged through said oil drain passage under the action of centrifugal force;
  wherein said front drum includes an outer cylinder disposed radially outwardly of said first boss, an inner cylinder disposed between said outer cylinder and said first boss, and a radially extending rib extending between said first boss and said outer cylinder, said outer and inner cylinders defining said first piston chamber, said inner cylinder and said first boss defining said second piston chamber, and said oil passage for said first piston chamber being formed in said rib.

8. An oil pressure clutch mechanism for an automatic transmission, comprising:

a front drum including a first boss and first and second piston chambers, said first boss defining an axis of said front drum, first and second clutches mounted in said front drum, first and second pistons displaceably mounted in said first and second piston chambers, respectively, for actuating said first and second clutches, an oil cover including a second boss coaxially disposed in said first boss and including an outer face defining an interface with an inner face of said first boss, first and second axially spaced oil conducting circular grooves formed in said outer face of said second boss, first and second oil passages formed in said front drum in a manner connecting said circular grooves with respective ones of said piston chambers for conducting oil from a pump to said piston chambers to displace said first and second pistons, seal means in said interface for resisting leakage of fluid from said first and second circular grooves, a circular drain groove formed in said interface axially between said first and second circular grooves for receiving leaked oil therefrom, and an oil drain passage extending through said front drum, said oil drain passage having an inlet end communicating with said drain groove and an outlet end opening to the exterior of said front drum, said outlet end spaced farther from said axis than said inlet end is spaced from said axis, whereby leaked oil is discharged through said oil drain passage under the action of centrifugal force;

wherein said seal means includes first and second axially spaced seal rings disposed between said inner and outer faces, said first and second seal rings positioned axially between said first and second circular grooves, with said drain groove disposed axially between said first and second seal rings.

* * * * *